Figure 1:
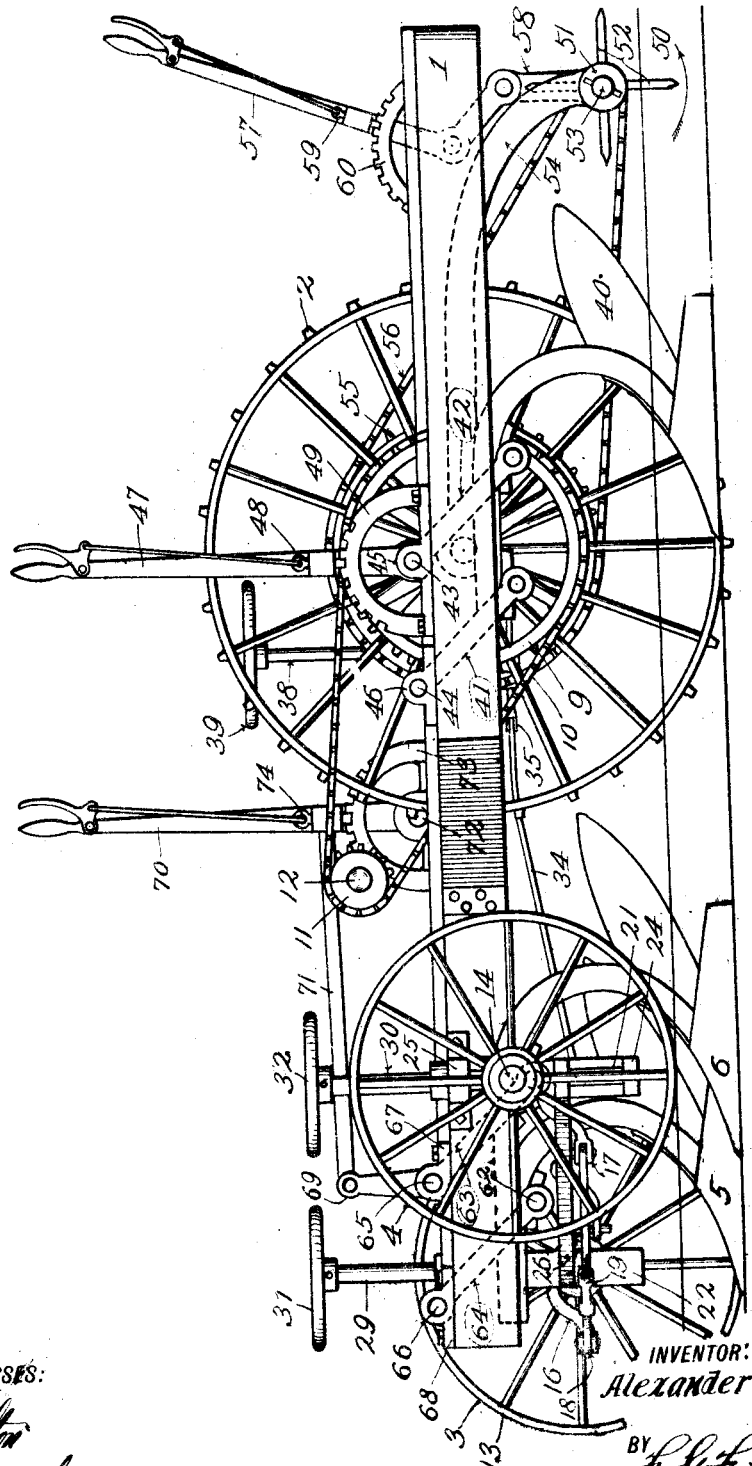

A. CROSS.
MOTOR PLOW.
APPLICATION FILED NOV. 24, 1913.

1,163,895.

Patented Dec. 14, 1915.
3 SHEETS—SHEET 1.

WITNESSES:
R. Hamilton
L. J. Fischer

INVENTOR:
Alexander Cross,
BY F. G. Fischer
ATTORNEY

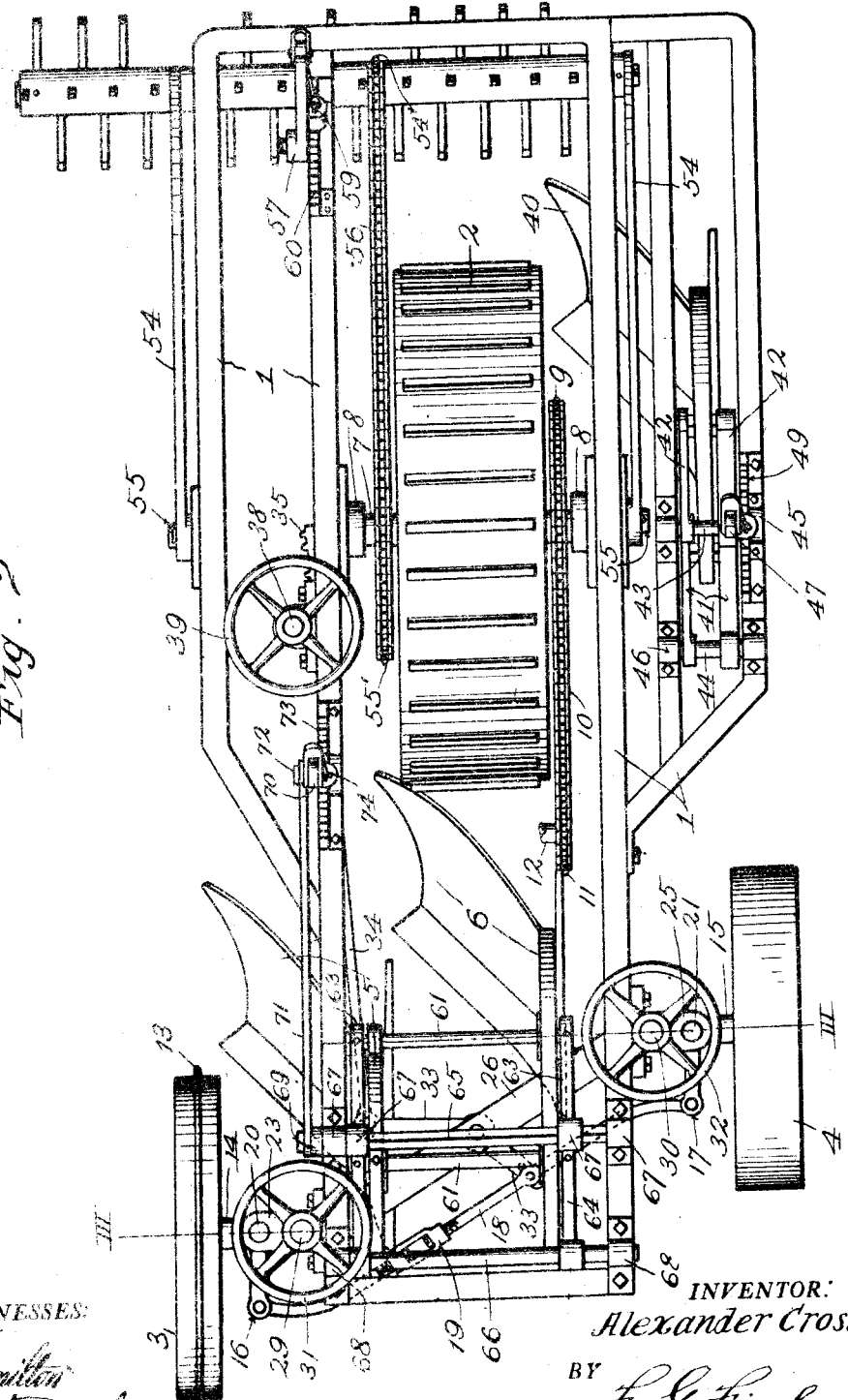

A. CROSS.
MOTOR PLOW.
APPLICATION FILED NOV. 24, 1913.
1,163,895.
Patented Dec. 14, 1915.
3 SHEETS—SHEET 3.
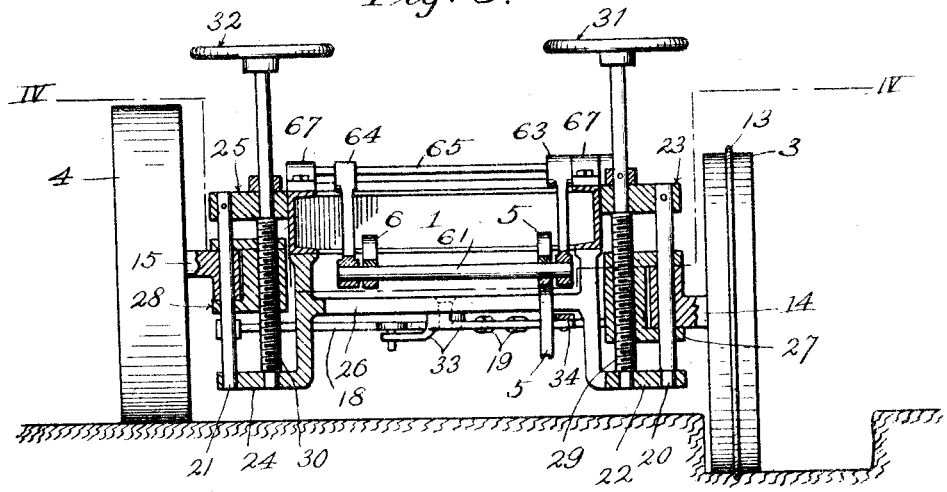
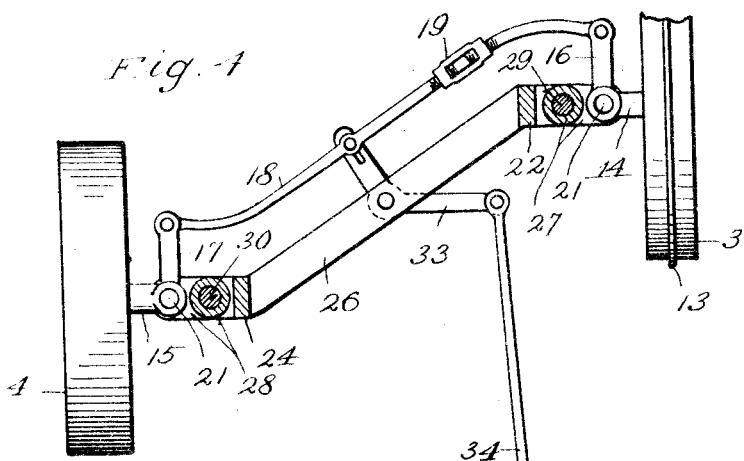
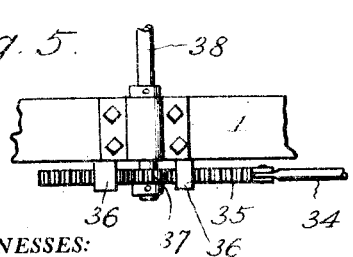
WITNESSES:
R. L. Hamilton
L. J. Fischer
INVENTOR:
Alexander Cross,
BY
F. G. Fischer,
ATTORNEY.

UNITED STATES PATENT OFFICE.

ALEXANDER CROSS, OF CHESTERTON, INDIANA.

MOTOR-PLOW.

1,163,895.  Specification of Letters Patent.  Patented Dec. 14, 1915.

Application filed November 24, 1913. Serial No. 802,619.

*To all whom it may concern:*

Be it known that I, ALEXANDER CROSS, a citizen of the United States, residing at Chesterton, in the county of Porter and State of Indiana, have invented certain new and useful Improvements in Motor-Plows, of which the following is a specification.

My invention relates to improvements in motor plows, and my object is to provide a new and useful plow of this character whereby one or more furrows may be simultaneously plowed and the soil thoroughly pulverized and leveled; also a plow that can be turned around in a comparatively short space.

In order that the invention may be fully understood, reference will now be made to the accompanying drawings, in which:

Figure 1 is a side elevation of the plow in plowing position. Fig. 2 is a plan view of the plow. Fig. 3 is an irregular, vertical, cross section on line III—III of Fig. 2. Fig. 4 is an irregular, horizontal, section of part of the steering gear on line IV—IV of Fig. 3. Fig. 5 is a broken, detail, side elevation of part of the steering gear.

In carrying out the invention. I employ a main frame 1, constructed, preferably, of channel bars, so that it will be sufficiently strong and rigid to withstand the various strains to which it is subjected.

Frame 1 is carried by a traction wheel 2 and front wheels 3 and 4. Wheel 4 performs the function of a land-wheel in regulating the depth of the two forward plows 5 and 6, in addition to coacting with wheel 3 in guiding the plow.

Traction wheel 2 is fixedly-mounted upon a rear axle 7, journaled in bearings 8 and provided with a large fixedly-journaled sprocket wheel 9, driven by an endless sprocket chain 10 running around a small sprocket wheel 11 fixed upon a jack-shaft 12, adapted to be driven from a suitable motor through the intermediacy of clutches, etc., (not shown).

The wheel 3 has a peripheral flange 13 to prevent the plow from sliding laterally when on sloping ground. Wheels 3 and 4 are mounted upon stub axles 14 and 15 provided with forwardly extending crank-arms 16 and 17, respectively, secured to a connecting-bar 18 provided with a turn-buckle 19, so that it may be lengthened or shortened to normally maintain the wheels 3 and 4 in parallel position.

The stub axles 14 and 15 are pivotally mounted upon spindles 20 and 21, spindle 20 being carried in brackets 22—23 and spindle 21 being carried by brackets 24—25, respectively. All of said brackets are secured to the main frame 1. Brackets 22 and 24 are also rigidly connected by a brace 26 to prevent them from springing toward or away from each other.

The stub axles 14 and 15 extend through the bifurcated portions of nuts 27 and 28 mounted upon vertical screws 29 and 30, respectively. Screw 29 is journaled in brackets 22—23 and provided at its upper end with a hand wheel 31, whereby it may be rotated to the right or to the left to adjust the wheel 3 vertically through the intermediacy of nut 27, which is held from rotating with said screw 29 through its sliding contact with the spindle 20, Fig. 3.

The front wheel 4 is adjusted vertically in the same manner as the front wheel 3, its nut 28 being raised and lowered through the intermediacy of the screw 30, which is journaled in the brackets 24 and 25 and provided at its upper end with a hand-wheel 32 whereby it may be rotated either to the right or left, the nut 28 being held from rotation with the screw 30 through its sliding contact with the spindle 21.

The connecting-bar 18 is shifted either to the right or left to guide the wheels 3 and 4, through the intermediacy of a bell-crank lever 33 pivoted to the brace 26, a connecting-rod 34 pivoted at its forward end to lever 33, a rack-bar 35 pivoted at one end to the connecting-rod 34 and extending through guides 36 at its opposite end, a pinion 37 intermeshing with the rack-bar 35 to actuate the same, a vertical shaft 38 upon which the pinion 37 is rigidly mounted, and a steering-wheel 39 fixed to the upper end of shaft 38 to rotate the latter either to the right or left.

40 designates a plow arranged in the rear of plows 5 and 6 and to one side of the traction wheel 2, so that a furrow can be plowed close to a fence and thus avoid the customary waste space between said fence and the adjacent furrow.

Plow 40 is suspended from links 41—42 pivotally connected at their upper ends to the main frame 1 through the intermediacy of stub shafts 43—44 and bearings 45—46, respectively.

Shaft 44 is provided with a fixedly-mounted hand lever 47 whereby the plow 40 may be raised or lowered. Lever 47 is provided with the customary latch 48 coacting with a notched sector 49 to lock the lever in any of its adjusted positions.

50 designates a clod pulverizer and soil leveler comprising a hub 51 and spikes 52 radiating from said hub. Hub 51 is mounted upon a shaft 53 carried by a pair of beams 54 pivotally mounted at their forward ends upon a pair of trunnions 55, projecting from opposite sides of the main frame 1. The pulverizer 50 follows in the wake of the plows 5, 6 and 40 and thoroughly breaks up clods left by said plows, and also levels the surface of the soil.

The pulverizer 50 is driven in the same direction as the traction wheel 2 and at a greater speed than the latter, so that it will tend to assist said traction wheel in propelling the machine forward instead of retarding it.

The driving of the pulverizer is accomplished through the intermediacy of a small sprocket 54' fixedly mounted upon the hub 51, a large sprocket wheel 55' fixedly mounted upon the rear axle 7, and an endless sprocket chain 56 running around the sprocket wheels 54' and 55'.

The pulverizer 50 is adjusted vertically to either lift it from the ground or regulate its depth therein, by a hand lever 57 pivotally mounted upon the main frame, and a link 58 pivotally connected at its ends to said lever and the hub 51. Hand lever 57 is provided with a latch 59, which coacts with a notched sector 60 in locking the lever 57 in any of its adjusted positions.

The forward plows are carried on shafts 61—62 suspended by links 63—64, mounted at their upper ends upon shafts 65—66, journaled in bearings 67—68, respectively, upon the main frame 1.

Links 63 are fixedly-mounted at their upper ends upon the shaft 65 to rock therewith and thus raise and lower the plows 5 and 6.

Shaft 65 is rocked to raise and lower the plows 5 and 6, through the intermediacy of a crank arm 69 fixed to one end of said shaft 65, a lever 70, and a connecting-rod 71 pivotally secured at its ends to said crank arm 69 and the lever 70.

Lever 70 is fulcrumed upon a stud 72, carried by a notched sector 73, secured to the top of frame 1 to coact with a latch 74, whereby the lever 70 is locked in any of its adjusted positions.

Having thus described my invention, what I claim and desire to secure by Letters Patent is:

1. In a machine of the class described, a frame, a pair of front wheels for supporting the forward end of the frame, upper and lower brackets carried by the frame, spindles having their upper and lower ends fixed in the respective brackets, nuts having bifurcations slidably engaging the spindles, screw shafts threaded through the nuts and journaled in the brackets and in spaced parallel relation to the spindles, stub axles for the wheels, said axles having their inner ends located between and in contact with said bifurcations and pivotally and slidably engaged with said spindles, and means for rotating the screw shafts to raise or lower the nuts.

2. In combination with a frame and a pair of front wheels therefor, a pair of vertical spindles borne by the frame, a stub axle slidable along the length of each spindle, a pair of rotatable screws journaled in the frame and disposed adjacent the respective spindles, means on the upper ends of the screws to allow the latter to be manually rotated, means slidably mounted on the spindles and in threaded engagement with the screws and actuated by the rotatable movements of the latter and connected to said stub axles for raising or lowering the latter, and transverse means on the frame connecting the respective spindles and adjacent screws to hold the spindles and screws against vertical and transverse movements.

In testimony whereof I affix my signature, in the presence of two witnesses.

ALEXANDER CROSS.

Witnesses:
 F. G. FISCHER,
 L. J. FISCHER.